United States Patent [19]

Mower

[11] Patent Number: 5,003,552

[45] Date of Patent: Mar. 26, 1991

[54] CARRIER AIDED CODE TRACKING LOOP

[75] Inventor: Vaughn L. Mower, Bountiful, Utah

[73] Assignee: Unisys Corporation, Blue Bell, Pa.

[21] Appl. No.: 439,735

[22] Filed: Nov. 20, 1989

[51] Int. Cl.$^5$ .............................................. H04L 27/30
[52] U.S. Cl. ...................................... 375/1; 375/115;
370/107; 380/34
[58] Field of Search ....................... 375/111, 115, 120;
380/34; 370/107

[56] References Cited

U.S. PATENT DOCUMENTS

| | | | |
|---|---|---|---|
| 4,017,798 | 4/1977 | Gordy et al. | 375/1 |
| 4,041,391 | 8/1977 | Deerkoski | 375/1 X |
| 4,122,393 | 10/1978 | Gordy et al. | 375/1 |
| 4,279,018 | 7/1981 | Carson | 375/1 X |
| 4,435,822 | 3/1984 | Spencer et al. | 375/1 |

Primary Examiner—Stephen C. Buczinski
Assistant Examiner—Bernarr E. Gregory
Attorney, Agent, or Firm—John B. Sowell; Mark T. Starr; Thomas J. Scott

[57] ABSTRACT

A fast acquisition coherent code tracking loop for use in direct sequence spread spectrum systems is provided with an embedded frequency offset loop. The frequency offset loop in the code tracking loop is provided with a pair of multipliers, one of which is coupled to the carrier tracking loop through a scaling circuit and the second multiplier is coupled to the output of the highly stable VCO of the carrier tracking loop to provide extremely fast phase acquisition of the received PN code and very high frequency stability of the code tracking loop.

6 Claims, 2 Drawing Sheets

CARRIER AIDED CODE TRACKING LOOP

BACKGROUND OF THE INVENTION

1. Related Applications

The present application is related to my copending U.S. application 07/439,133, filed Nov. 20, 1989, and entitled "Improved Detection and Tracking Circuit for PN Code".

2. Field of the Invention

The present invention is related to coherent code tracking loops of the type employed to produce a synchronized pseudonoise (PN) clock signal from a received PN signal. More particularly, the present invention relates to a novel code tracking loop having means for injecting frequency error compensation information into the tracking loop for enhancing the acquisition time of the received PN code.

3. Description of the Prior Art

Heretofore, coherent code tracking loops have been employed to produce PN clock signals which are synchronized to the received PN code sequence signal. Since the received PN code frequency may be affected by doppler frequency shift and/or transmitter offset frequencies, the received PN code frequency differs from the frequency of the VCO in the code tracking loop. Any frequency offset requires longer acquisition time for the received frequency shifted or frequency offset PN code signal.

Heretofore, it was known that a carrier steering correction voltage could be produced by scaling the output phase error signal, or VCO frequency error signal, produced by the carrier tracking loop. The VCO error signal results from frequency deviations between the received carrier signal and the nominal frequency of the VCO in the carrier tracking loop, thus, may be employed to steer or direct the code tracking loop frequency in the direction of the shifted or shifting received code sequence signals.

It would be extremely desirable to provide an improved code tracking loop whose acquisition time is aided by the carrier tracking loop.

SUMMARY OF THE INVENTION

A principal object of the present invention is to provide a novel carrier aided coherent code tracking loop.

A principal object of the invention is to provide a tracking loop having a scaling frequency signal derived from a coherent carrier tracking loop coupled into the code tracking loop to provide faster PN code acquisition.

It is a principal object of the present invention to provide a novel frequency offset loop coupled in series in the code tracking loop to permit injection of scaling frequency carrier tracking loop information.

It is a general object of the present invention to provide a code tracking loop having improved stability and enhanced speed of code acquisition.

DESCRIPTION OF THE PREFERRED EMBODIMENT

Figure 1:
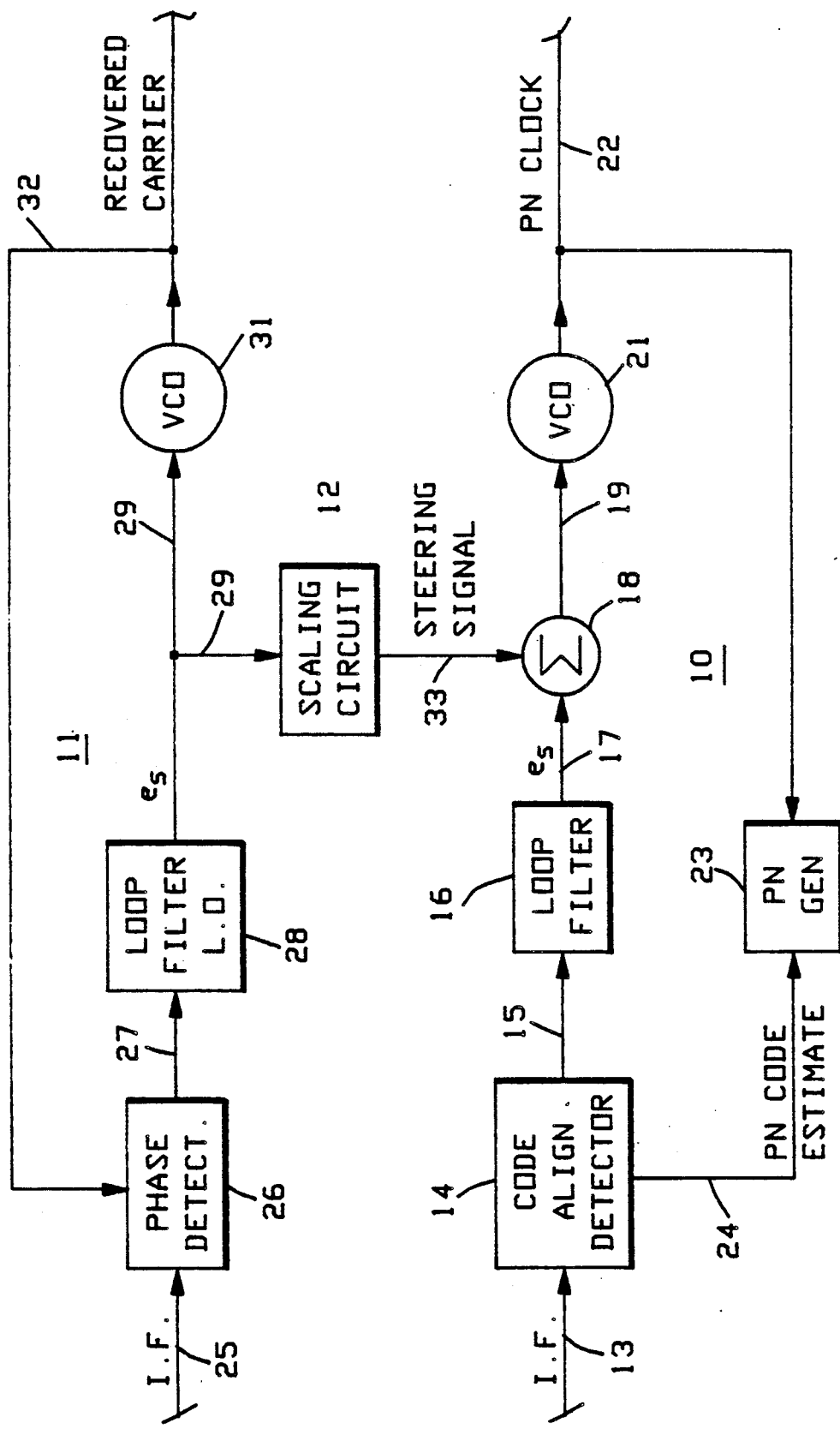
FIG. 1 is a block diagram of a prior art code tracking loop having scaled coarse steering information derived from a carrier loop added to the code tracking loop VCO input.

Refer now to FIG. 1 showing a prior art code tracking loop 10 and a prior art carrier tracking loop 11 coupled thereto through a scaling circuit 12. The I.F. signal on line 13 is the incoming PN code sequence signal and is applied to a code alignment detector 14. Such code alignment detectors may be implemented in the form of a delay-lock loop or a tau-dither loop to provide a phase error signal on output line 15. The phase error signal on line 15 is applied to a loop filter 16 to provide an error signal $e_s$ on output line 17 which is applied to a summing circuit 18. The output of the summing circuit on line 19 is applied to a VCO 21 to provide the PN clock on output line 22. The PN clock on line 22 is looped back to a PN generator 23 which produces a PN code estimate or replica signal on line 24 that is applied to the input of the code alignment detector 14 and causes the code alignment detector to maintain phase lock on the incoming PN code sequence signal. The I.F. signal on line 25 is not the same I.F. signal as on line 13 but is produced after passing through a well-known spread spectrum demodulator correlator and contains an I.F. carrier frequency to which the carrier tracking loop 11 can lock onto. The I.F. carrier signal on line 25 is applied to a phase detector 26 to provide a error signal output on line 27 which is filtered in loop filter 28 to produce the error signal $e_s$ on line 29 which is applied to the voltage controlled oscillator 31 of the carrier tracking loop. The recovered carrier on line 32 is looped back to the phase detector 26 and compared with the carrier input frequency and phase on line 25 to produce the aforementioned error signal on line 27. It will be understood that the carrier tracking loop 11 produces an error signal on line 29 which is indicative of the frequency difference between the quiescent frequency of VCO 31 and the carrier signal on line 25 and by definition includes any frequency errors occurring on line 25. The signal on line 29 is not highly accurate and is subject to temperature drift effects and requires that the scaling circuit 12 be especially designed to be compatible with the particular VCO 31 employed in the carrier tracking loop 11. Thus, the steering signal produced on line 33 is a gross analog voltage value which merely directs or steers the VCO 21 in the direction of correction of the drift present in the carrier signal on line 25.

Figure 2:
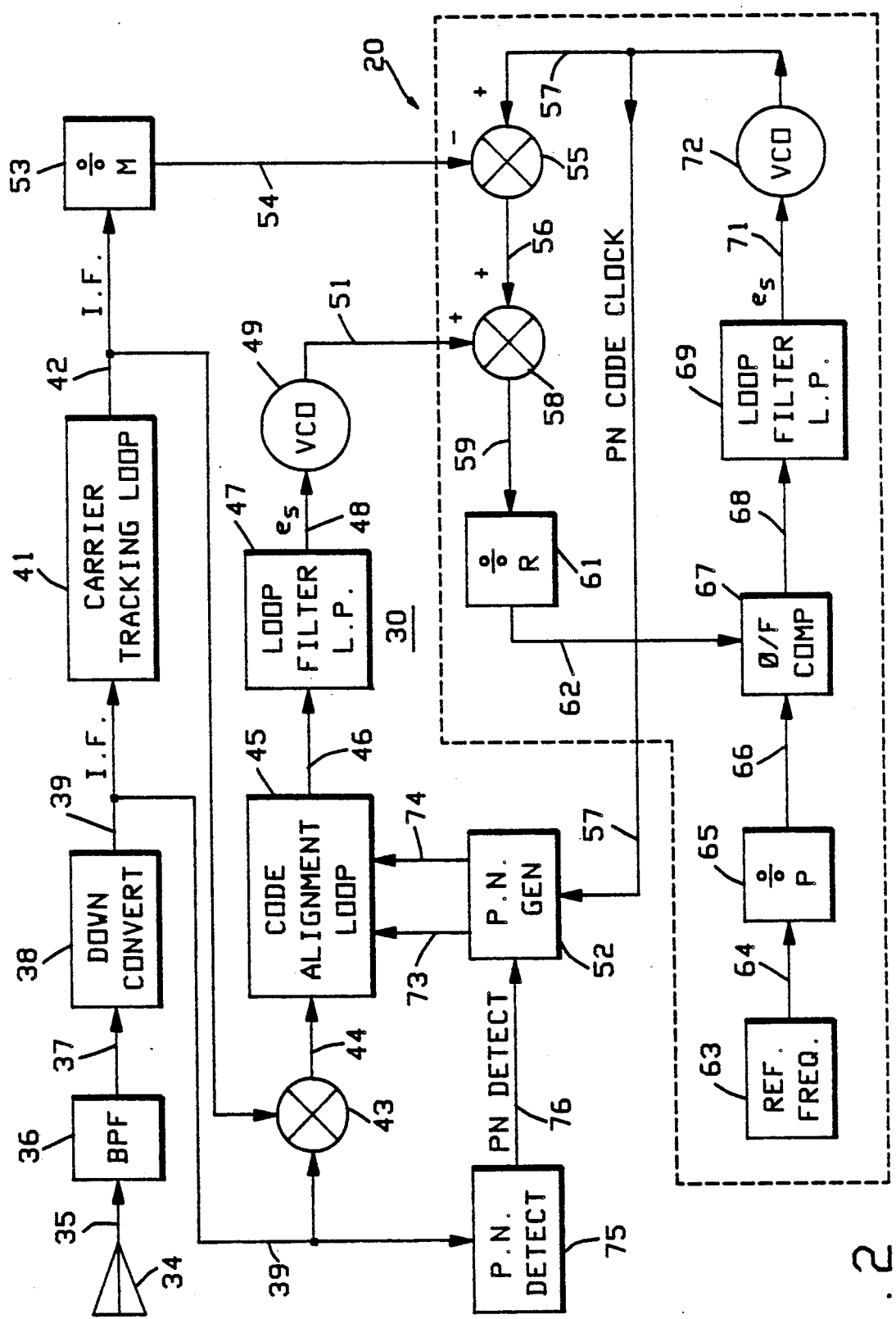
FIG. 2 is a detailed block diagram of the preferred embodiment of the present invention showing an improved code tracking loop having a novel frequency offset loop embedded in series therein.

Refer now to FIG. 2 showing a block diagram of the preferred embodiment of the present invention which includes a novel frequency offset loop 20 embedded in the coherent code tracking loop 30.

Antenna 34 is shown coupled via line 35 to a bandpass filter 36 which produces an R F. signal on line 37 that is coupled to a down converter 38. The I.F. output of down converter 38 on line 39 is coupled to a carrier tracking loop 41 which produces the recovered I.F. carrier on line 42 which is applied to an input of the down converter mixer 43 along with the I.F. signal on line 39. It is important to note that the coherent tracking loop 30 requires that the recovered I.F. carrier signal on line 42 be phase coherent with the I.F. carrier signal on line 39 at down converter mixer 43 in order to maintain coherency. The output signal from mixer 43 on line 44 is a baseband signal which is applied to the code alignment detector 45 to produce an unfiltered error signal on line 46. The unfiltered error signal on line 46 is filtered by loop filter 47 to provide the error voltage signal $e_s$ on line 48 which is applied to the VCO 49.

Ordinarily the output of the VCO 49 on line 51 would be the PN code clock signal which would be applied to the input of the PN generator 52, however, the frequency offset loop 20 is interposed in series in the carrier tracking loop to provide means for compensating for doppler offset during acquisition and also to provide a more stable code tracking loop 30.

The I.F. carrier frequency signal on line 42 is applied to a divide-by-M circuit 53 to provide a lower frequency steering signal on line 54 which is applied to a first multiplier 55 at the negative port input. The frequency signal on output line 56 is equal to the frequency on input line 57 minus the scale down frequency on input line 54. The frequency signal on line 56 is applied to a positive port of multiplier 58 along with the output of the VCO 49 on line 51 of the code tracking loop 30. The two frequency signals applied to positive ports of the multiplier 58 produce the sum of the input frequencies on output ine 59 which is applied to a divide-by-R circuit 61 to produce a reduced frequency version of the input signal on output line 62.

A very stable reference frequency source 63 produces a source of reference signals on line 64 which are reduced by the divide-by-P circuit 65 to provide a very stable reduced version of the reference frequency source on line 66. The frequency signal on line 66 is compared with the frequency signal on line 62 in the phase/frequency comparator 67 to produce an error signal on line 68. The error signal on line 68 is filtered in lowpass loop filter 69 to produce the voltage error signal $e_s$ on line 71 required to adjust the voltage controlled oscillator 72 to the desired frequency. In this particular case, the desired frequency is the PN code clock frequency which will equal the frequency of the incoming PN code sequence when locked. As is well known, the local PN code being produced by the PN generator 52 is slipped in relation to the received PN code in order to attain acquisition of the received PN code. One way of implementing the code alignment detector 45 is to provide a delayed PN code on line 73 and an advanced PN code on line 74 which permits the delayed lock loop in code detector 45 to track the phase of the incoming code on line 44. When the local code and the received PN codes are aligned with each other, the PN detector 75 produces a high voltage signal output on line 76 indicating that the PN codes are nearly aligned or in partial correlation. It is during this short time period when the codes are partially correlated that both the carrier tracking loop 41 and the code tracking loop 30 must lock onto their received signals. Immediately after code alignment, a fast coherent carrier tracking loop 41 must quickly acquire the carrier lock and provide a coherent I.F. carrier signal to the coherent code tracking loop 30. The coherent code tracking loop 30 must then quickly acquire both the PN clock frequency and the PN phase of the clock to achieve a locked condition. It will be understood that the initial code alignment is a condition that only lasts for a few milliseconds depending on the specific doppler or offset frequency conditions and the chipping rate of the PN code, thus, it is imperative that both the carrier tracking loop 41 and the code tracking loops 30 must lock onto their incoming signals before the received PN code drifts out of correlation.

Having explained a preferred embodiment of the present invention, it will be understood that the novel frequency offset scaling loop 20 of the present invention provides a pair of mixer/multipliers 55, 58, one which performs accurate doppler error correction and the second which provides enhanced stability of the code tracking loop 30. Steering means 41, 53, 55 performs accurate doppler error correction which permits phase tracking in loop 20.

In the preferred embodiment of the present invention, the value of M is equal to the ratio of the carrier frequency at line 35 divided by the PN clock chipping rate present on the signal at line 35 as the result of modulating the PN signal onto the carrier. In the preferred embodiment of the present invention, the nominal PN clock frequency on line 57 was 80 MHz and the divide-by-R circuit 61 employed a divider integer equal to 29. The reference frequency of reference frequency source 63 was set at 10 MHz and the divide-by-P circuit 65 employed a divider integer of 4. The R.F. carrier frequency on line 35 was set at 10 GHz and the I.F. frequency on line 39 was set at 1 GHz. Thus, the value of M is obtained by dividing the R.F. frequency on line 39 by the PN clock frequency of 80 MHz at the output of VCO 72 to obtain a value of M equal to 125. In the preferred embodiment of the present invention, the VCO 49 was implemented with a voltage controlled crystal oscillator of high stability at 500 KHz. Thus, the stability of the 80 MHz code tracking loop 30 is essentially the same as the stability of the VCO 49. Stated differently, the stability of the 80 MHz code tracking loop has substantially the same stability as the lower frequency voltage controlled crystal oscillator 49. As a result of this stability in the code tracking loop, along with the doppler correction provided at the multiplier 55, the acquisition time of the PN code is dramatically reduced and enhanced.

What is claimed is:

1. A fast acquisition coherent code tracking loop of the type employed to produce a synchronized PN clock from a received PN code signal, comprising:

a PN generator for generating a PN replica code, a code alignment detector coupled to receive said received PN code signal and coupled to said PN generator for providing an unfiltered error signal indicative of the phase offset between the received PN code signal and said PN replica code, a loop filter coupled to receive said unfiltered error signal for producing a phase offset error signal, frequency offset loop means, an accurate VCO having its input port coupled to receive said phase offset error signal and its output port coupled in series with said frequency offset loop means and to said PN generator, a coherent carrier tracking loop for producing an I.F. carrier frequency signal, and scaling means in said coherent carrier tracking loop for injecting scaled carrier tracking loop correction information into said frequency offset loop means to enhance the speed of acquisition of said received PN code signal.

2. A fast acquisition coherent code tracking loop as set forth in claim 1 wherein said frequency offset loop means comprises a first multiplier in series in said frequency offset loop means and having a negative input port coupled to the output port of said scaling means for introducing doppler error correction information into said code tracking loop.

3. A fast acquisition coherent code tracking loop as set forth in claim 2 wherein said frequency offset loop means comprises a second multiplier in series in said frequency offset loop means and having a positive input port coupled to the output of said accurate VCO in said code tracking loop for enhancing stability of said code tracking loop.

4. A fast acquisition coherent code tracking loop as set forth in claim 1 wherein said frequency offset loop means further comprises phase/frequency comparator means in said frequency offset loop means.

5. A fast acquisition coherent code tracking loop as set forth in claim 4 which further comprises a highly accurate frequency reference source coupled to said phase/frequency comparator means.

6. A fast acquisition coherent code tracking loop as set forth in claim 5 which further includes a frequency divider in series between said frequency reference source and said phase/frequency comparator means.

* * * * *